United States Patent
Ornan et al.

(10) Patent No.: US 11,560,072 B2
(45) Date of Patent: Jan. 24, 2023

(54) SEAT TRACK COVERING SYSTEMS AND METHODS

(71) Applicant: THE BOEING COMPANY, Chicago, IL (US)

(72) Inventors: Rachelle N. Ornan, Seattle, WA (US); Dean Hettick, Snohomish, WA (US); Amy L. Wisch, Seattle, WA (US); Patrick William O'Neill, Seattle, WA (US); Mark L. Cloud, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 720 days.

(21) Appl. No.: 16/529,921

(22) Filed: Aug. 2, 2019

(65) Prior Publication Data

US 2020/0307417 A1 Oct. 1, 2020

Related U.S. Application Data

(60) Provisional application No. 62/825,850, filed on Mar. 29, 2019.

(51) Int. Cl.
| | |
|---|---|
| *H02G 3/30* | (2006.01) |
| *B60N 2/07* | (2006.01) |
| *H02G 3/04* | (2006.01) |
| *B60R 16/02* | (2006.01) |
| *B64D 11/06* | (2006.01) |

(52) U.S. Cl.
CPC ......... *B60N 2/0725* (2013.01); *H02G 3/0418* (2013.01); *H02G 3/0437* (2013.01); *H02G 3/30* (2013.01); *B60R 16/0215* (2013.01); *B60Y 2200/51* (2013.01); *B64D 11/0696* (2013.01)

(58) Field of Classification Search
CPC ..................................................... B60P 7/0815
See application file for complete search history.

(56) References Cited

U.S. PATENT DOCUMENTS

| | | | | |
|---|---|---|---|---|
| 5,228,659 | A * | 7/1993 | Potes, Jr. | B60N 2/0715 297/344.1 |
| 6,659,402 | B1 * | 12/2003 | Prochaska | B64D 11/0696 244/118.6 |
| 7,172,155 | B2 * | 2/2007 | Feist | B64D 11/0624 244/118.6 |
| 7,713,009 | B2 | 5/2010 | Hudson | |
| 7,785,053 | B2 | 8/2010 | Hudson | |
| 8,128,326 | B2 | 3/2012 | Hudson | |
| 8,920,085 | B2 | 12/2014 | Hudson | |

(Continued)

OTHER PUBLICATIONS

U.S. Appl. No. 16/365,788, filed Mar. 27, 2019.

(Continued)

*Primary Examiner* — Krystal Robinson
(74) *Attorney, Agent, or Firm* — The Small Patent Law Group LLC; Joseph M. Butscher

(57) ABSTRACT

A seat track covering system and method are configured to cover a seat track and one or more cables within an internal cabin of a vehicle. The seat track covering system and method include a seat track cover that securely couples to the seat track, and at least one cover adjustment member moveably coupled to the seat track cover. The seat track cover and the cover adjustment member(s) cover at least a portion of the seat track and at least a portion of the cable(s).

20 Claims, 8 Drawing Sheets

(56) References Cited

U.S. PATENT DOCUMENTS

| | | |
|---|---|---|
| 9,567,086 B2 | 2/2017 | Siegmeth |
| 2006/0097109 A1* | 5/2006 | Laib .................. B64D 11/0696 244/118.6 |
| 2015/0145298 A1* | 5/2015 | Wottke ..................... B64C 1/18 297/243 |
| 2016/0362181 A1* | 12/2016 | Neville ............. B64D 11/0624 |
| 2021/0016681 A1* | 1/2021 | Tippy ..................... B60N 2/305 |
| 2021/0101506 A1* | 4/2021 | Scott .................... B60P 7/0815 |
| 2021/0221519 A1* | 7/2021 | Gilbert .............. B64D 11/0643 |

OTHER PUBLICATIONS

U.S. Appl. No. 16/365,777, filed Mar. 27, 2019.
U.S. Appl. No. 16/529,935, filed Aug. 2, 2019.
U.S. Appl. No. 16/671,226, filed Nov. 1, 2019.
U.S. Appl. No. 16/529,946, filed Aug. 2, 2019.
U.S. Appl. No. 16/529,957, filed Aug. 2, 2019.
U.S. Appl. No. 16/368,925, filed Mar. 29, 2019.
U.S. Appl. No. 16/367,314, filed Mar. 28, 2019.
U.S. Appl. No. 16/368,934, filed Mar. 29, 2019.
U.S. Appl. No. 16/671,238, filed Nov. 1, 2019.

* cited by examiner

SEAT TRACK COVERING SYSTEMS AND METHODS

RELATED APPLICATIONS

This application relates to and claims priority benefits from U.S. Provisional Patent Application No. 62/825,850, entitled "Seat Track Covering Systems and Methods," filed Mar. 29, 2019, which is hereby incorporated by reference in its entirety.

FIELD OF EMBODIMENTS OF THE DISCLOSURE

Embodiments of the present disclosure generally relate to seat track covering systems and methods, and more particularly, to seat track covering systems and methods that allow for efficient adjustment of seats within an internal cabin of a vehicle.

BACKGROUND OF THE DISCLOSURE

Commercial aircraft typically include an internal cabin that may be divided into numerous sections. A cockpit is generally separated from a passenger cabin, which may include a first class section, a business class section, an economy section, and the like. Each section within a passenger cabin may have a different spacing or pitch between rows of seats. For example, a first class section typically has a greater pitch between rows of seats as compared to an economy section.

Between flights of an aircraft, an operator may decide to reconfigure certain seating areas to adjust the pitch between certain rows of seats. For example, an operator may decide to change a row of an economy section into an economy plus section, or vice versa. The pitch between rows of the economy section may differ from the pitch between rows of the economy plus section.

In order to change the pitch between rows of seats, the seats of at least one of the rows are completely removed and lifted from seat tracks. The seats are then moved to a new position, where they are secured to the seat tracks. Aircraft mechanics typically use tools to remove the seats from the seat tracks, reposition and align the seats in relation to the new positions, and securely lock the seats in the new positions. Moreover, any electrical connections within the seats are typically disconnected before the seats are moved, and then reconnected at the new positions.

Rows of seats aboard vehicles often have cables (such as wiring, electrical conduits, and/or the like) extending therebetween. For example, one or more cables extending between rows of seats may connect electrically connect to electrical components of the seats. When a pitch between the rows of seats is changed, the cables may also need to be reconfigured. For example, if the pitch is to be increased, a length of the cables is also increased. Conversely, if the pitch is to be decreased, the length of the cables is decreased.

The cables and seat tracks between rows of seats are typically covered by a seat track cover. However, when the pitch between the rows of seats is changed, the seat track covers are typically discarded and replaced with different seat track covers that are tailored to the changed pitch.

As can be appreciated, the process of removing the seats from the seat tracks, moving the seats to new positions, and securing the seats at the new positions is time and labor intensive. If there is a relatively short time until a subsequent flight, there may not be sufficient time to adjust the seats to new positions.

SUMMARY OF THE DISCLOSURE

A need exists for an efficient system and method for moving seats within an internal cabin of an aircraft. Further, a need exists for a system and method that allow for quick and efficient adjustment of seats within an internal cabin. Moreover, a need exists for an efficient system and method for covering a seat track and cables as a pitch between seats is changed.

With those needs in mind, certain embodiments of the present disclosure provide a seat track covering system that is configured to cover one or both of a seat track or one or more cables within an internal cabin of a vehicle. The seat track covering system includes a seat track cover, which may be configured to securely couple to the seat track, and at least one cover adjustment member moveably coupled to the seat track cover. The seat track cover and the cover adjustment member(s) cover one or both of at least a portion of the seat track or at least a portion of the cable(s). In at least one embodiment, the cover adjustment member(s) is selectively moveable in relation to the seat track cover to adapt to one or both of a changing pitch or a changing length of the cable(s) between a first seat assembly and a second seat assembly within the internal cabin.

In at least one embodiment, the seat track cover includes a covering sleeve having lateral ends connected to a main body. The main body upwardly bows from the lateral ends.

In at least one embodiment, the seat track cover includes a seat track coupler that is configured to securely couple the seat track cover to the seat track. For example, the seat track coupler includes a longitudinal fin that extends along at least a portion of a length of the seat track cover, and prongs extending from the fin. The prongs are configured to hook under retaining arms of the seat track to securely couple the seat track cover to the seat track.

In at least one embodiment, the cover adjustment member(s) includes a covering sleeve that is slidably coupled to the seat track cover. In at least one embodiment, the covering sleeve is positioned over the seat track cover and conforms to an outer surface of the seat track cover. The covering sleeve may include a main body connected to lateral hooks that hook around lateral ends of the seat track cover.

In at least one embodiment, the cover adjustment member is selectively moveable between at least one fully extended position and a fully retracted position in relation to the seat track cover.

The seat track cover may be longer than the cover adjustment member(s). The seat track covering system may also include an extension cover adjustment member moveably coupled to the cover adjustment member(s). In at least one embodiment, a first cover adjustment member is moveably secured in relation to a first end of the seat track cover, and a second cover adjustment member is moveably secured in relation to a second end of the seat track cover.

Certain embodiments of the present disclosure provide a seat track covering method that is configured to cover a seat track and one or more cables within an internal cabin of a vehicle. The seat track covering method includes securely coupling a seat track cover to the seat track, moveably coupling at least one cover adjustment member to the seat track cover, and covering at least a portion of the seat track and the cable(s) with the seat track cover and the cover adjustment member(s).

Certain embodiments of the present disclosure provide a vehicle including an internal cabin, a first floor panel within the internal cabin, a second floor panel within the internal cabin, a seat track extending between the first floor panel and the second floor panel, a first seat assembly coupled to the seat track, and a second seat assembly coupled to the seat track. The first seat assembly and the second seat assembly are spaced apart from one another. The vehicle also includes a seat track covering system that covers the seat track and one or more cables within the internal cabin, as described herein.

DETAILED DESCRIPTION OF THE DISCLOSURE

The foregoing summary, as well as the following detailed description of certain embodiments, will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Certain embodiments of the present disclosure provide seat track covering systems and methods that include a cover adjustment member (such as a sheath or housing) that is moveably coupled to a seat track cover that securely couples to a seat track. The cover adjustment member and the seat track cover are configured to adaptively cover a seat track and cables that extend between a first seat in a first row of seats and a second seat in a second row of seats, in which the pitch between the first seat and the second seat is changeable. The cover adjustment member is selectively moveable in relation to the seat track cover to adapt to a changing pitch and/or a changing length of cable between seat assemblies.

Embodiments of the present disclosure provide seat track covering systems and methods that eliminate, minimize, or reduce a need to replace or modify seat track covers when re-pitching seats within a vehicle. The seat track covering systems and methods allow for quick and efficient reconfiguration of seats within an internal cabin of a vehicle, thereby reducing a time that the vehicle is not in service.

The seat track covering systems and methods allow for an adaptable length. For example, the seat track covering system has an adaptable length that is configured to adapt to a changing pitch between seats. The length may be expanded or contracted based on the changing pitch.

Figure 1:
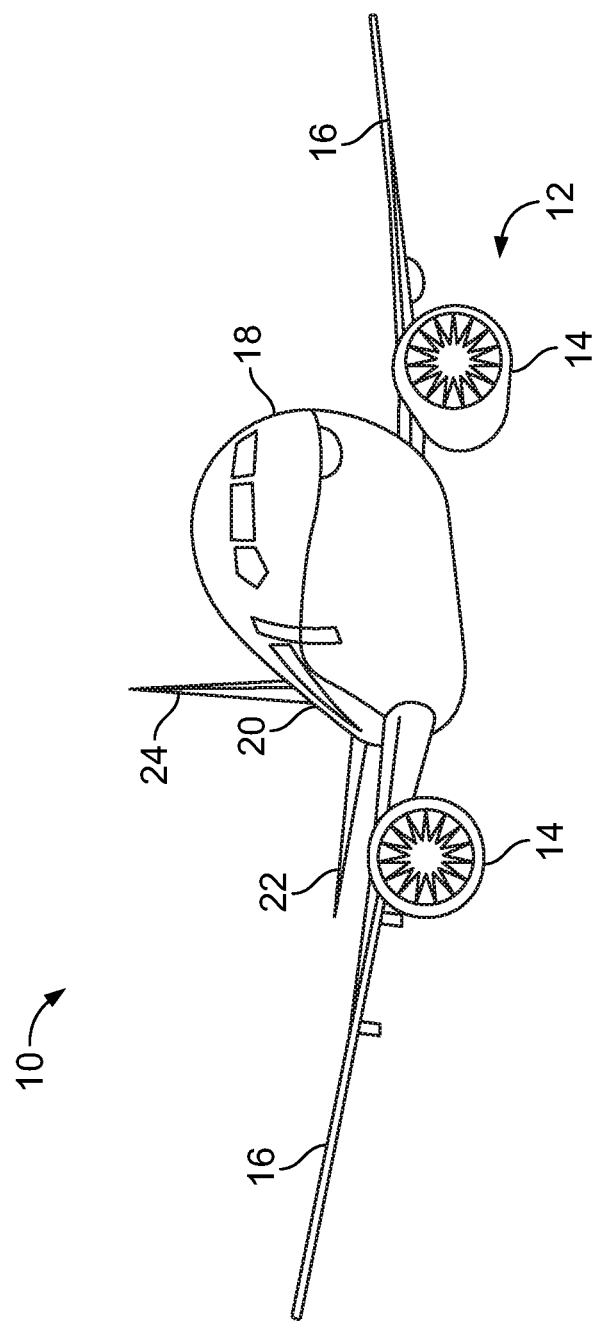
FIG. 1 illustrates a perspective front view of an aircraft, according to an embodiment of the present disclosure.

FIG. 1 illustrates a perspective top view of a vehicle, such as an aircraft 10, according to an embodiment of the present disclosure. The aircraft 10 includes a propulsion system 12 that may include two turbofan engines 14, for example. Optionally, the propulsion system 12 may include more engines 14 than shown. The engines 14 are carried by wings 16 of the aircraft 10. In other embodiments, the engines 14 may be carried by a fuselage 18 and/or an empennage 20. The empennage 20 may also support horizontal stabilizers 22 and a vertical stabilizer 24.

The fuselage 18 of the aircraft 10 defines an internal cabin, which may be defined by interior sidewall panels that connect to a ceiling and a floor. The internal cabin may include a cockpit, one or more work sections (for example, galleys, personnel carry-on baggage areas, and the like), one or more passenger sections (for example, first class, business class, and economy sections), and an aft section in which an aft rest area assembly may be positioned. Overhead stowage bin assemblies may be positioned throughout the internal cabin.

Alternatively, instead of an aircraft, embodiments of the present disclosure may be used with various other vehicles, such as automobiles, buses, locomotives and train cars, seacraft, spacecraft, and the like.

Figure 2A:
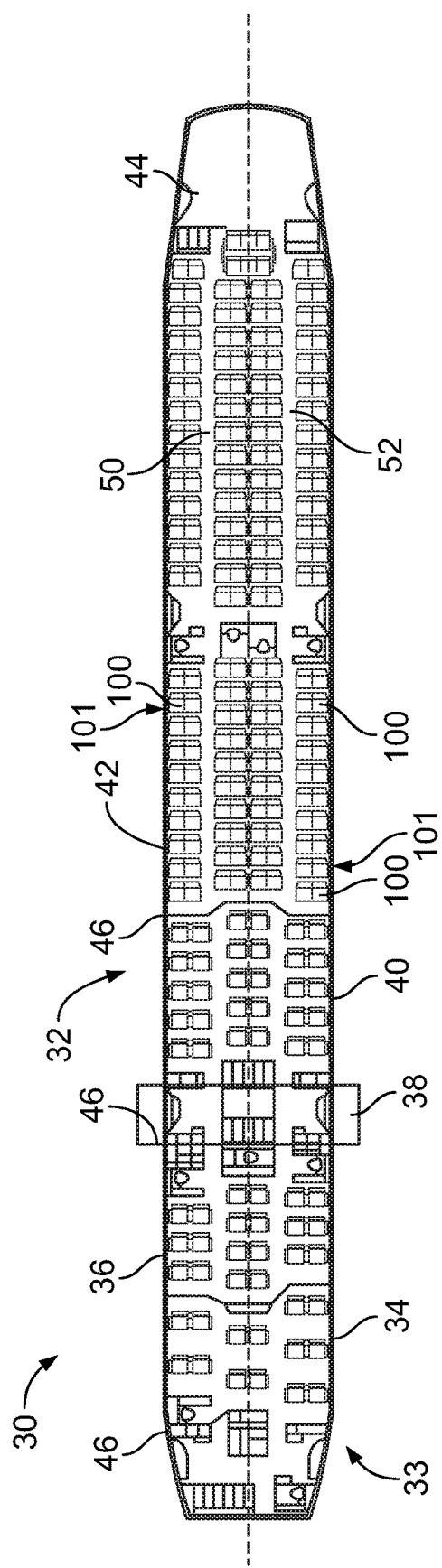
FIG. 2A illustrates a top plan view of an internal cabin of an aircraft, according to an embodiment of the present disclosure.

FIG. 2A illustrates a top plan view of an internal cabin 30 of an aircraft, according to an embodiment of the present disclosure. The internal cabin 30 may be within a fuselage 32 of the aircraft. For example, one or more fuselage walls may define an interior of the internal cabin 30. The interior of the internal cabin 30 is defined by sidewall panels that connect to a ceiling and a floor. The sidewall panels include lateral segments that connect to ceiling segments. The lateral segments define lateral wall portions, while the ceiling segments define at least portions of the ceiling within the internal cabin 30.

The internal cabin 30 includes multiple sections, including a front section 33, a first class section 34, a business class section 36, a front galley station 38, an expanded economy or coach section 40, a standard economy or coach section 42, and an aft section 44, which may include multiple lavatories and galley stations. It is to be understood that the internal cabin 30 may include more or less sections than shown. For example, the internal cabin 30 may not include a first class section, and may include more or less galley stations than shown. Each of the sections may be separated by a cabin transition area 46.

As shown in FIG. 2A, the internal cabin 30 includes two aisles 50 and 52 that lead to the aft section 44. Optionally, the internal cabin 30 may have less or more aisles than shown. For example, the internal cabin 30 may include a single aisle that extends through the center of the internal cabin 30 that leads to the aft section 44.

Seat assemblies 100 are positioned throughout the internal cabin 30. The seat assemblies 100 may be arranged in rows 101. The spacing or pitch between rows 101 of adjacent seat assemblies 100 may be adjusted (for example, increased or decreased).

Figure 2B:
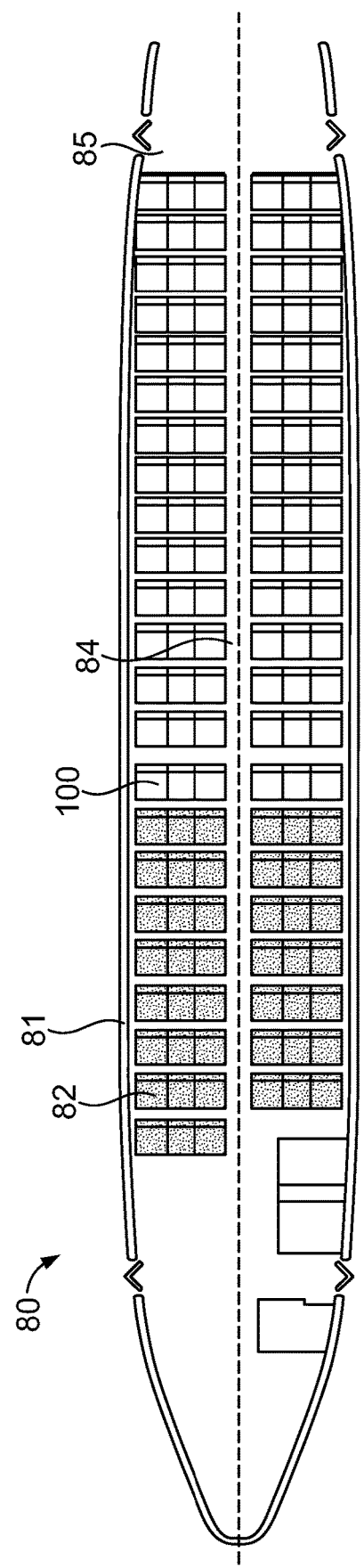
FIG. 2B illustrates a top plan view of an internal cabin of an aircraft, according to an embodiment of the present disclosure.

FIG. 2B illustrates a top plan view of an internal cabin 80 of an aircraft, according to an embodiment of the present disclosure. The internal cabin 80 may be within a fuselage 81 of the aircraft. For example, one or more fuselage walls may define the interior of the internal cabin 80. The internal cabin 80 includes multiple sections, including a main cabin 82 having passenger seat assemblies 100, and an aft section 85 behind the main cabin 82. It is to be understood that the internal cabin 80 may include more or less sections than shown.

The internal cabin 80 may include a single aisle 84 that leads to the aft section 85. The single aisle 84 may extend through the center of the internal cabin 80 that leads to the aft section 85. For example, the single aisle 84 may be coaxially aligned with a central longitudinal plane of the internal cabin 80.

Figure 3:
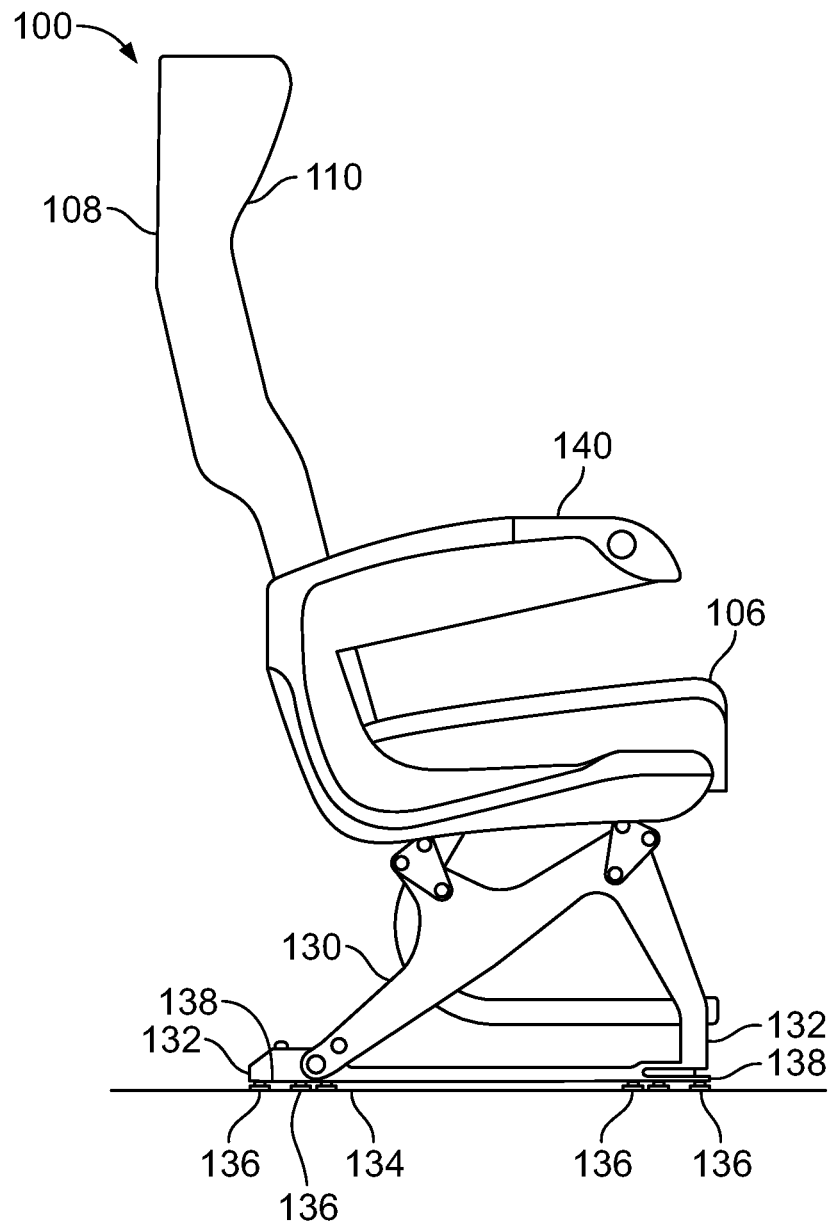
FIG. 3 illustrates a side view of a seat assembly, according to an embodiment of the present disclosure.

FIG. 3 illustrates a side view of a seat assembly 100, according to an embodiment of the present disclosure. The seat assembly 100 is configured to be secured within an internal cabin of a vehicle, such as a commercial aircraft.

The seat assembly 100 includes a base 130, which may include legs 132 that may be secured to seat tracks 134 within a cabin of a vehicle. In at least one embodiment, securing studs 136 (such as shear studs) downwardly extend from lower surfaces 138 of the legs 132. The securing studs 136 are securely retained within the seat tracks 134. The seat tracks 134 are configured to securely couple to the securing studs 136 to secure the seat assembly 100 in place. The base 130 supports a seat cushion 106 and a backrest 108, which includes a headrest 110. Arm rests 140 may be pivotally secured to the backrest 108.

The seat assembly 100 may be sized and shaped differently than shown in FIG. 3. The seat assembly 100 may include more or less components than shown in FIG. 3. It is to be understood that the seat assembly 100 shown in FIG. 3 is merely one example of a seat assembly that may be disposed within an internal cabin of a vehicle.

Figure 4:
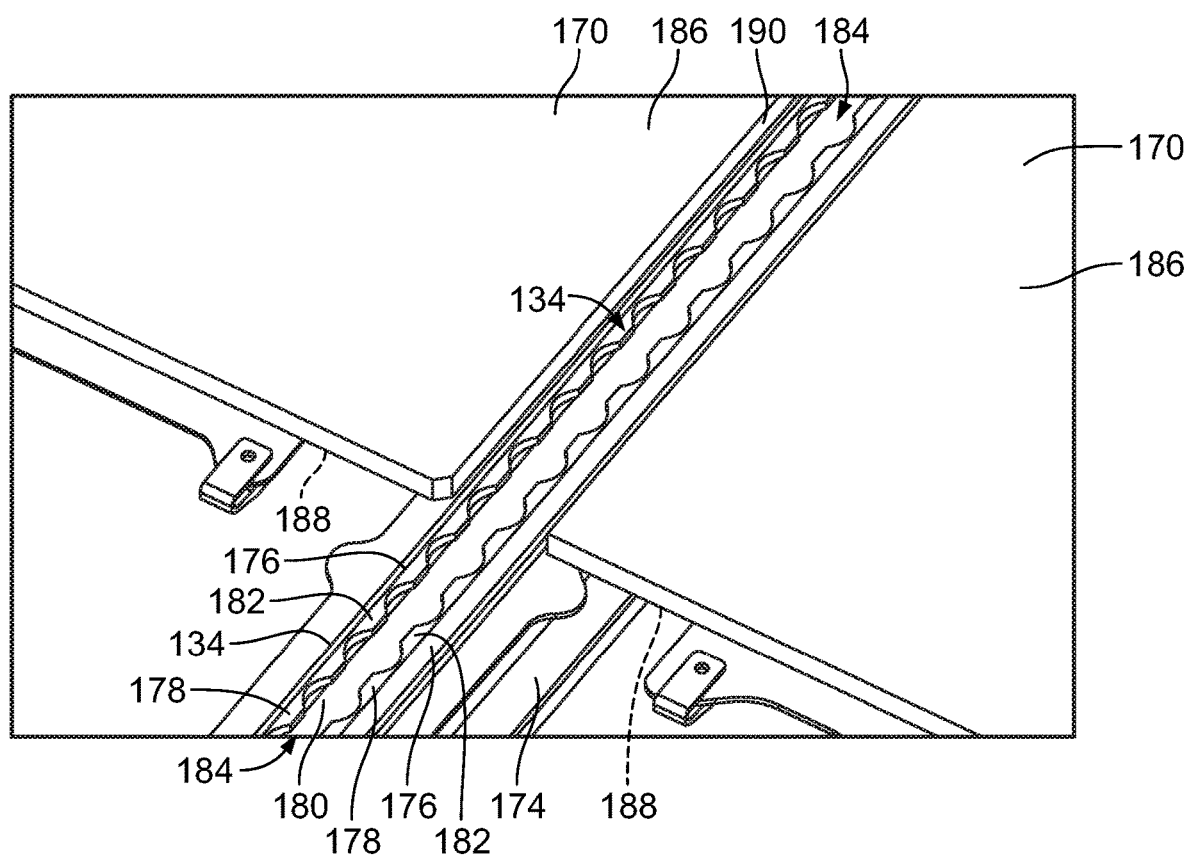
FIG. 4 illustrates a perspective top view of a seat track secured between floor panels, according to an embodiment of the present disclosure.

FIG. 4 illustrates a perspective top view of the seat track 134 secured between floor panels 170, according to an embodiment of the present disclosure. The seat track 134 includes a base 174 and lateral walls 176 extending upwardly from the base 174. A retaining lip 178 inwardly extends from a top end of each lateral wall 176, such as at a ninety-degree angle. The retaining lips 178 cooperate to form a series of expanded openings 180 and retaining arms 182 over a track channel 184. The expanded openings 180 and retaining arms 182 alternate over a length of the seat track 134. That is, two expanded openings 180 are separated by a retaining arm 182.

The floor panels 170 include upper planar support surfaces 186 opposite from lower surfaces 188. The upper planar surface surfaces 186 connect to the lower surfaces 188 at edges, such as interior edges 190.

Referring to FIGS. 3 and 4, the securing studs 136 of the seat assembly 100 may have a circular cross section and a width that is less than a width of the expanded openings 180 of the seat track 134. The width of the securing studs 136 is greater than a width of the opening between opposed retaining arms 182. As such, when the securing studs 136 are positioned directly beneath the retaining arms 182, the securing studs 136 are locked in position, such that they are unable to eject through the opening between the retaining arms 182, thereby securely coupling the seat assembly 100 to the seat track 134. In contrast, when the securing studs 136 are shifted into the track channel 184 below or into the expanded openings 180, the securing studs 136, and therefore the legs 132 of the seat assembly 100, may be lifted out of the seat track 134.

In order to adjust the seat assembly 100 to a different longitudinal position, a lock fitting (such as a bolt or other such fastener) may be manipulated to unlock the legs 132 from a secure position in relation to the seat track(s) 134. For example, the lock fitting may be loosened such that a distal end no longer engages a portion of the seat track 134. Optionally, the seat assembly 100 may not include lock fittings.

After the lock fitting disengages from the seat track 134, the seat assembly 100 may be longitudinally shifted in relation to the seat track 134. In this manner, a pitch between seat assemblies 100 within adjacent rows may be changed. That is, the seat assemblies 100 may be unlocked, slid to a different position relative to the seat tracks 134, and then locked into a different position. The pitch between seat assemblies 100 may be changed through various systems and methods other than described herein.

Figure 5:
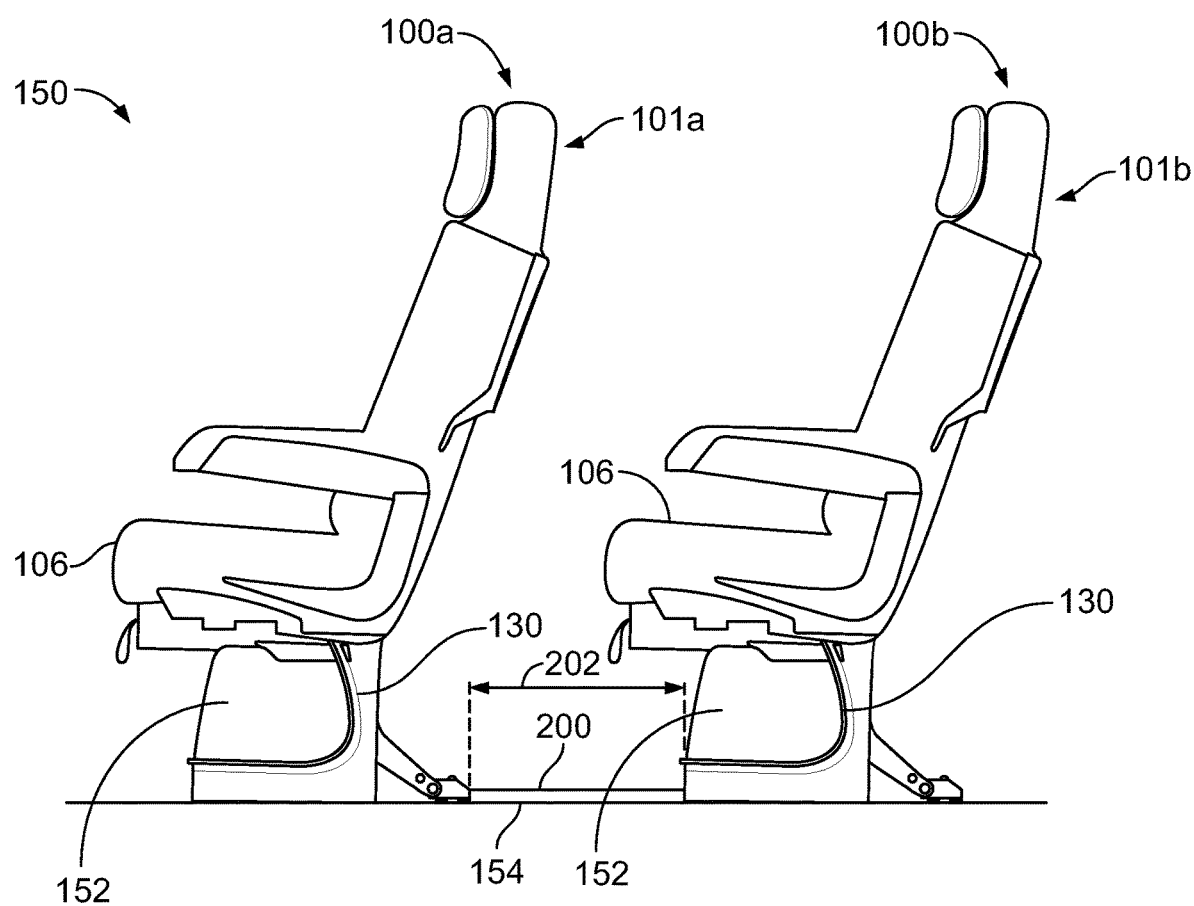
FIG. 5 illustrates a lateral view of a first seat assembly of a first row and a second seat assembly of a second row within an internal cabin, according to an embodiment of the present disclosure.

FIG. 5 illustrates a lateral view of a first seat assembly 100a of a first row 101a and a second seat assembly 100b of a second row 101b within an internal cabin 150 (such as the internal cabins 30 and 80 of FIGS. 2A and 2B, respectively), according to an embodiment of the present disclosure. The seat assemblies 100a and 100b are examples of the seat assembly 100 shown and described with respect to FIG. 3.

In at least one embodiment, an electrical interface housing 152 is disposed underneath the seat cushions 106 of the seat assemblies 100a and 100b, such as within or proximate to the bases 130. For example, the electrical interface housing 152 may be a seat inflight entertainment (IFE) interface. The electrical interface housing 152 contains cable segments (such as electrical wiring) that provide electrical power and signals to electrical components of the seat assemblies 100a and 100b. The cable segments of the seat assemblies 100a and 100b are connected together through one or more cables 154 that run parallel to the seat tracks 134 (shown in FIGS. 3 and 4). The cable(s) 154 may be retained within a cable track or raceway formed in floor panels, or positioned over the floor panels and covered by a seat track covering system 200, which also covers the seat track 134 between the seat assemblies 100a and 100b.

In at least one embodiment, the cable segments within the electrical interface housings 152 and the cable 154 are part of a single, unitary electrical cable. In at least one other embodiment, portions of the cable segments and/or the cable 154 may be separate pieces that are connected together through plug and receptacle interfaces.

Embodiments of the present disclosure provide seat track covering systems and methods that allow for quick and efficient adjustment of the cable(s) 154 between the seat assemblies 100a and 100b. FIG. 5 shows two rows 101a and 101b of seat assemblies 100a and 100b. The seat cable adjustment systems and methods may be used between additional seat assemblies of additional rows. For example, an electrical cable may extend between three or more rows of seat assemblies, and embodiments of the present disclosure allow for quick and easy adjustment of the cable as a pitch between at least two of the rows is adjusted.

The seat track covering system 200 includes an adjustable length 202. The length 202 is adjustable as a pitch between the seat assemblies 100a and 100b is changed and/or as a length of the cable(s) 154 between the seat assemblies 100a and 100b is changed. For example, the length 202 is decreased as the pitch between the seat assemblies 100a and 100b is decreased, and/or the length of the cables 154 between the seat assemblies 100a and 100b is decreased. Conversely, the length 202 is increased as the pitch between the seat assemblies 100a and 100b is increased, and/or the length of the cables 154 between the seat assemblies 100a and 100b is increased.

Figure 6:
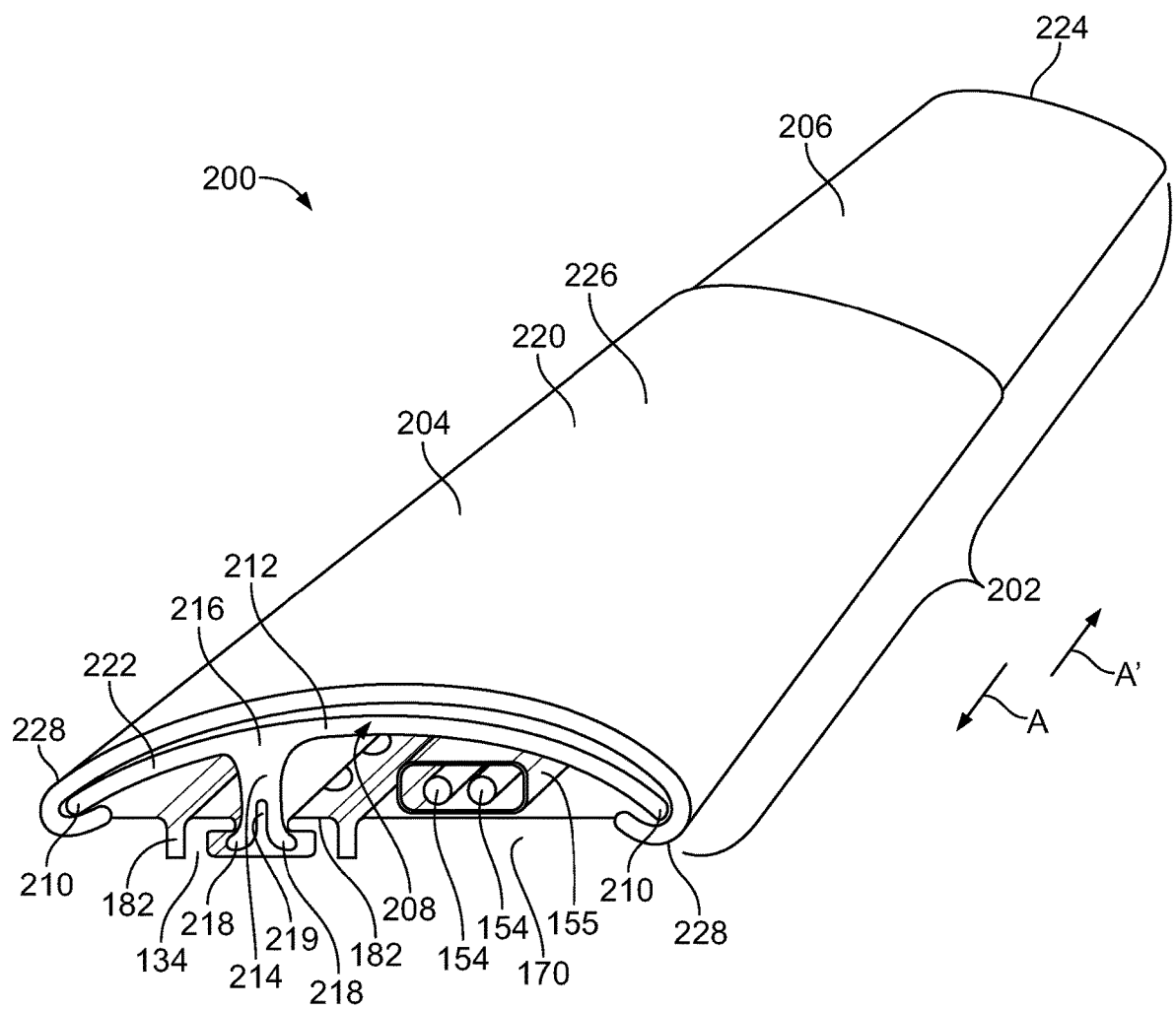
FIG. 6 illustrates a perspective view of a seat track covering system covering a seat track and cables, according to an embodiment of the present disclosure.

FIG. 6 illustrates a perspective view of the seat track covering system 200 covering the seat track 134 and cables 154, according to an embodiment of the present disclosure. The seat track covering system 200 includes a cover adjustment member 204 (such as a sheath, cuff, housing, or the like) that is moveably coupled to a seat track cover 206 that securely couples to the seat track 134. Referring to FIGS. 5 and 6, the cover adjustment member 204 and the seat track cover 206 adaptively cover the seat track 134 and the cables 154 that extend between the seat assembly 100a in the first row 101a and the second seat assembly 100b in the second row 101b, in which the pitch between the first seat assembly 100a and the second seat assembly 100b is changeable.

Optionally, the cover adjustment member 204 and the seat track cover 206 may adaptively cover one of the seat track 134 or the cables 154. In at least one embodiment, in which the cover adjustment member 204 and the seat track cover 206 are positioned over just the cables 154, but not the seat track 134, the seat track cover 206 may securely couple to a raceway 155 and/or a portion of a floor panel 170. In such an embodiment, the seat track cover 206 may be referred to as a cable cover.

In at least one embodiment, the seat track covering system 200, including the cover adjustment member 204 and the seat track cover 206 are formed of a flexible material, such as a plastic, rubber, or the like. In at least one other embodiment, the seat track covering system 200 is formed of metal. In at least one other embodiment, one of the cover adjustment member 204 or the seat track cover 206 is formed of a flexible material, while the other is formed of a metal.

The length of the cables 154 changes as the pitch between the seat assemblies 100a and 100b changes. The cables 154 may be retained within a raceway 155, which may be mounted to a portion of a floor panel 170. Optionally, the cables 154 may not be retained within a raceway 155, but instead may rest on the floor panel 170. In at least one other embodiment, the cables 154 may be retained within one or more channels formed in the floor panel 170.

As shown, two cables 154 extend between the seat assemblies 100a and 100b. Optionally, only a single cable 154 may extend between the seat assemblies 100a and 100b. In at least one other embodiment, three or more cables 154 may extend between the seat assemblies 100a and 100b.

The seat track cover 206 includes a covering sleeve 208 having lateral ends 210 connected to a main body 212. The main body 212 upwardly bows from the lateral ends 210. A seat track coupler 214 extends downwardly from a lower surface of the main body 212 and securely couples the seat track cover 206 to the seat track 134. For example, the seat track coupler 214 includes a longitudinal fin 216 that extends along at least a portion of a length of the seat track cover 206. Prongs 218 (separated by a gap 219) downwardly extend from the fin 216 and hook under the retaining arms 182 of the seat track 134, thereby securely coupling the seat track cover 206 to the seat track 134.

The cover adjustment member 204 includes a covering sleeve 220 that is moveably coupled to the seat track cover 206. In at least one embodiment, covering sleeve 220 is slidably coupled to the seat track cover 206 and is configured to longitudinally extend over and away from a first end 222 of the seat track cover 206 in the direction of arrow A, and/or over and away from a second end 224 of the seat track cover 206 in the direction of arrow A'.

In at least one embodiment, the covering sleeve 220 is positioned over the seat track cover 206 and conforms to an outer surface of the seat track cover 206. The covering sleeve 220 includes a main body 226 connected to lateral hooks 228 that hook around the lateral ends 210 of the seat track cover 206. The main body 226 upwardly bows from the lateral hooks 228.

In order to extend the length 202 of the seat track covering system 200, the cover adjustment member 204 is slid outwardly from the first end 222 of the seat track cover 206 in the direction of arrow A, or optionally, slid outwardly from the second end 224 of the seat track cover 206 in the direction of arrow A'. Conversely, in order to retract the length 202 of the seat track covering system 200, the cover adjustment member 204 is slid inwardly toward the first end 222 of the seat track cover 206 in the direction of arrow A', or optionally slid inwardly toward the second end 224 of the seat track cover 206 in the direction of arrow A.

The seat track covering system 200 covers both the seat track 134 and the cables 154. As the pitch between the seat assemblies 100a and 100b and/or the length of the cables 154 is changed, the cover adjustment member 204 is adaptively moved in relation to the seat track cover 206 to accommodate the changed pitch between the seat assemblies 100a and 100b and/or the changed length of the cables 154 to ensure that the seat track 134 and the cables 154 remain covered.

Figure 7:
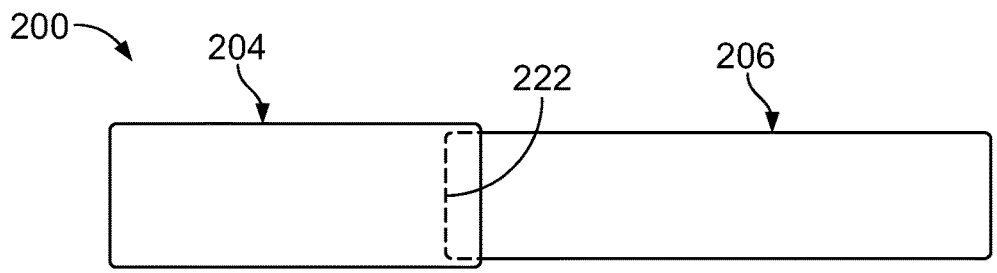
FIG. 7 illustrates a top view of the seat track covering system in a first fully extended position.

FIG. 7 illustrates a top view of the seat track covering system 200 in a first fully extended position. As shown, the cover adjustment member 204 is coupled to the seat track cover 204 and fully extended from the first end 222 of the seat track cover 204.

Figure 8:
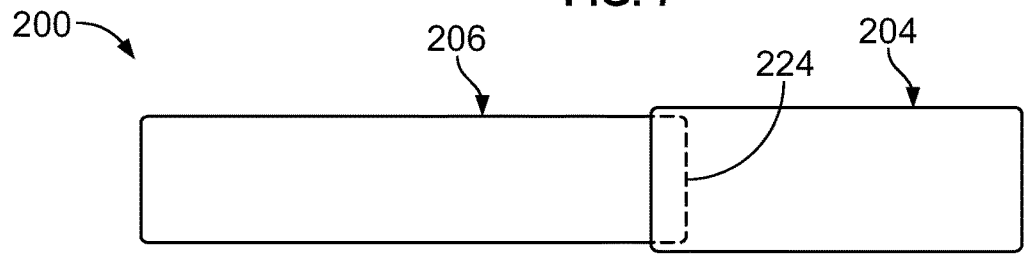
FIG. 8 illustrates a top view of the seat track covering system in a second fully extended position.

FIG. 8 illustrates a top view of the seat track covering system 200 in a second fully extended position. As shown, the cover adjustment member 204 is coupled to the seat track cover 204 and fully extended from the second end 224 of the seat track cover 204.

Figure 9:
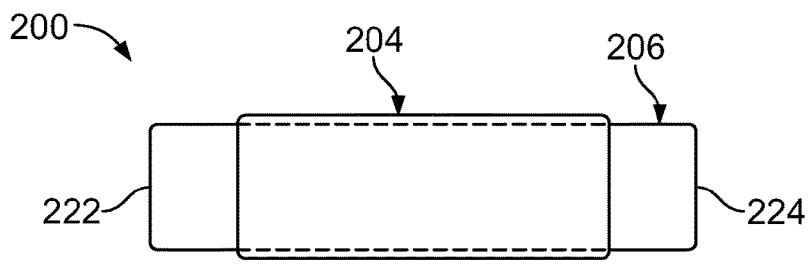
FIG. 9 illustrates a top view of the seat track covering system in a fully retracted position.

FIG. 9 illustrates a top view of the seat track covering system 200 in a fully retracted position. In the fully retracted position, the cover adjustment member 204 is coupled to the seat track cover 206 with no portion of the cover adjustment member 204 outwardly extending past the first end 222 or the second end 224.

Referring to FIGS. 6-9, the seat track cover 206 is longer than the cover adjustment member 204. The relative lengths of the seat track cover 206 and the cover adjustment member 204 may be greater or less than shown. In at least one other embodiment, the cover adjustment member 204 may be longer than the seat track cover 206. In such an embodiment, the fully retracted position is such that no portion of the seat track cover 206 longitudinally extends past any portion of the cover adjustment member 204.

Figure 10:
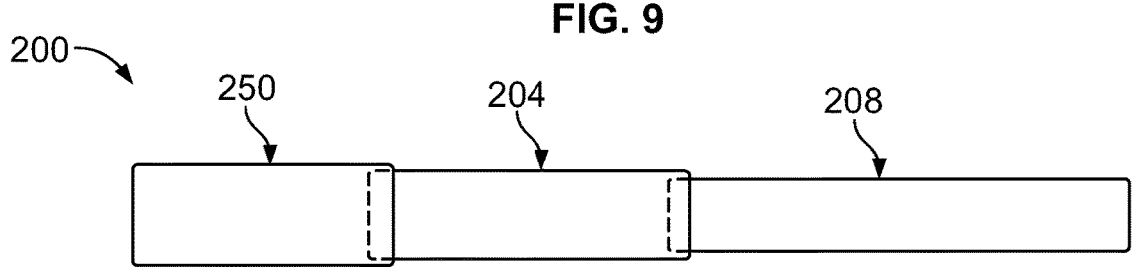
FIG. 10 illustrates a top view of the seat track covering system in a fully extended position, according to an embodiment of the present disclosure.

FIG. 10 illustrates a top view of the seat track covering system 200 in a fully extended position, according to an embodiment of the present disclosure. In this embodiment, an extension cover adjustment member 250 is moveably coupled to the cover adjustment member 204 in order to provide increased length to the seat track covering system 200 in the fully extended position. Additional extension cover adjustment members may also be moveably coupled to the seat track cover 206 and/or the extension cover adjustment member 250. In at least one embodiment, the seat track covering system 200 may be a telescopic seat track covering system.

Figure 11:
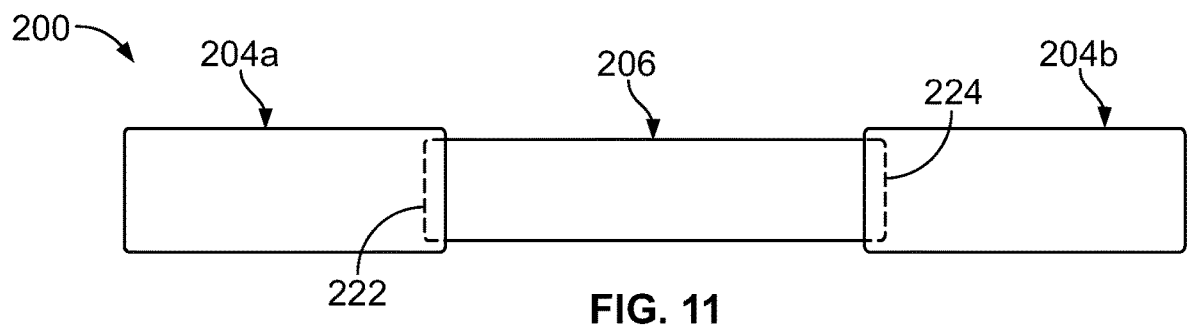
FIG. 11 illustrates a top view of the seat track covering system in a fully extended position, according to an embodiment of the present disclosure.

FIG. 11 illustrates a top view of the seat track covering system 200 in a fully extended position, according to an embodiment of the present disclosure. In this embodiment, a first cover adjustment member 204a is moveably secured in relation to the first end 222 of the seat track cover 206, and a second cover adjustment member 204b is moveably secured in relation to the second end 224 of the seat track cover 206.

Figure 12:
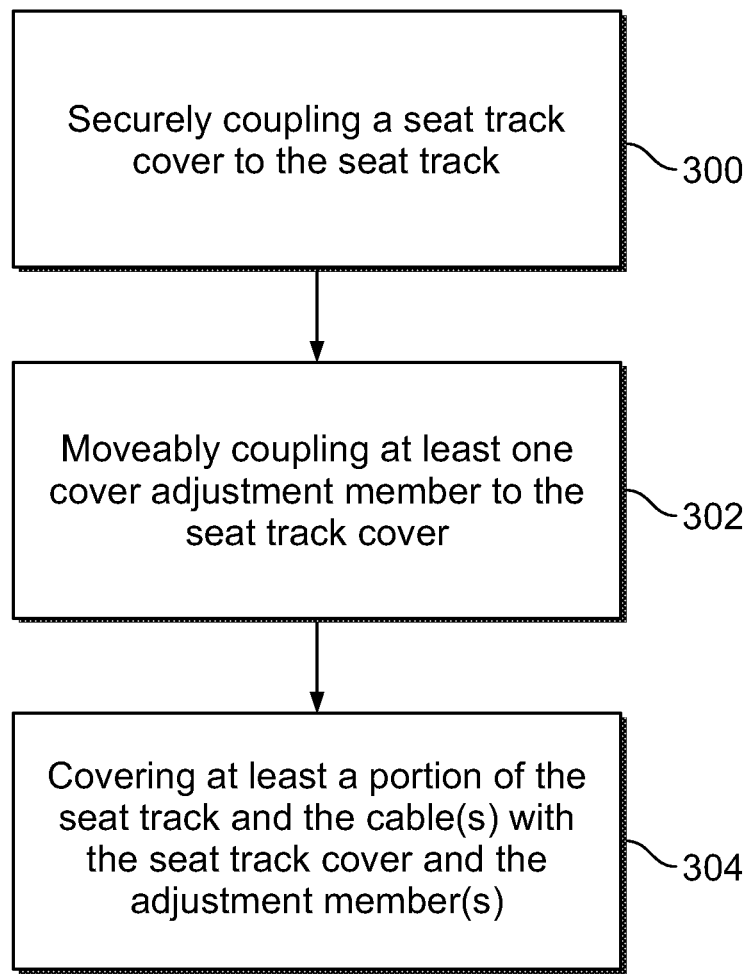
FIG. 12 illustrates a flow chart of a seat track covering method, according to an embodiment of the present disclosure.

FIG. 12 illustrates a flow chart of a seat track covering method, according to an embodiment of the present disclosure. The seat track covering method is configured to cover a seat track and one or more cables within an internal cabin of a vehicle. The seat track covering method includes securely coupling a seat track cover to the seat track at 300, moveably coupling at least one cover adjustment member to the seat track cover at 302, and covering at least a portion of the seat track and the cable(s) with the seat track cover and the adjustment member(s) at 304.

In at least one embodiment, the seat track covering method also includes selectively moving the cover adjustment member(s) in relation to the seat track cover to adapt to one or both of a changing pitch or a changing length of the cable(s) between a first seat assembly and a second seat assembly within the internal cabin.

The seat track covering method may also include securely coupling the seat track cover to the seat track with a seat track coupler.

In at least one embodiment, the moveably coupling includes slidably coupling a covering sleeve of the cover adjustment member(s) to the seat track cover. The moveably coupling may also include positioning the covering sleeve over the seat track cover. The moveably coupling may include hooking lateral hooks of the cover adjustment member(s) around lateral ends of the seat track cover.

In at least one embodiment, the seat track covering method also includes selectively moving the cover adjustment member between at least one fully extended position and a fully retracted position in relation to the seat track cover.

As described herein, embodiments of the present disclosure provide efficient systems and methods for moving seats within an internal cabin of an aircraft. Further, embodiments of the present disclosure provide systems and methods that allow for quick and efficient adjustment of seats within an internal cabin. Moreover, embodiments of the present disclosure provide efficient systems and methods for covering seat tracks and cables as a pitch between seats is changed.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A seat track covering system that is configured to cover one or both of a seat track or one or more cables within an internal cabin of a vehicle, the seat track covering system comprising:

a seat track cover including a seat track coupler that is configured to securely couple the seat track cover to the seat track, wherein the seat track coupler extends downwardly from a lower surface of a main body of the seat track cover, wherein the main body is between lateral ends of the seat track cover, wherein the seat track coupler comprises: (a) a longitudinal fin that extends along at least a portion of a length of the seat track cover; and (b) prongs extending from the fin, wherein the prongs are configured to extend into the seat track and hook under retaining arms of the seat track to securely couple the seat track cover to the seat track, wherein the seat track cover further comprises a first chamber disposed to a first side of the seat track coupler, and a second chamber disposed to a second side of the seat track coupler, wherein the first side is opposite from the second side, wherein the seat track covering system is configured to cover both the seat track and the one or more cables, and wherein the one or more cables are configured to be within one of the first chamber or the second chamber away from the seat track; and at least one cover adjustment member moveably coupled to the seat track cover, wherein the seat track cover and the at least one cover adjustment member cover one or both of at least a portion of the seat track or at least a portion of the one or more cables.

2. The seat track covering system of claim 1, wherein the at least one cover adjustment member is selectively moveable in relation to the seat track cover to adapt to one or both of a changing pitch or a changing length of the one or more cables between a first seat assembly and a second seat assembly within the internal cabin.

3. The seat track covering system of claim 1, wherein the seat track cover comprises a covering sleeve having lateral ends connected to a main body, wherein the main body upwardly bows from the lateral ends.

4. The seat track covering system of claim 1, wherein the at least one cover adjustment member comprises a covering sleeve that is slidably coupled to the seat track cover.

5. The seat track covering system of claim 4, wherein the covering sleeve is positioned over the seat track cover and conforms to an outer surface of the seat track cover.

6. The seat track covering system of claim 4, wherein the covering sleeve includes a main body connected to lateral hooks that hook around lateral ends of the seat track cover.

7. The seat track covering system of claim 1, wherein the cover adjustment member is selectively moveable between at least one fully extended position and a fully retracted position in relation to the seat track cover.

8. The seat track covering system of claim 1, wherein the seat track cover is longer than the at least one cover adjustment member.

9. The seat track covering system of claim 1, further comprising an extension cover adjustment member moveably coupled to the at least one cover adjustment member.

10. The seat track covering system of claim 1, wherein the at least one cover adjustment member comprises:
a first cover adjustment member moveably secured in relation to a first end of the seat track cover; and
a second cover adjustment member moveably secured in relation to a second end of the seat track cover.

11. A seat track covering method that is configured to cover a seat track and one or more cables within an internal cabin of a vehicle, the seat track covering method comprising:
securely coupling a seat track cover to the seat track, wherein the seat track cover comprises a seat track coupler that securely couples the seat track cover to the seat track, wherein the seat track coupler extends downwardly from a lower surface of a main body of the seat track cover, wherein the main body is between lateral ends of the seat track cover, wherein the seat track coupler comprises: (a) a longitudinal fin that extends along at least a portion of a length of the seat track cover; and (b) prongs extending from the fin, wherein the prongs extend into the seat track and hook under retaining arms of the seat track to securely couple the seat track cover to the seat track, wherein the seat track further comprises a first chamber disposed to a first side of the seat track coupler, and a second chamber disposed to a second side of the seat track coupler, wherein the first side is opposite from the second side;

moveably coupling at least one cover adjustment member to the seat track cover; and covering at least a portion of the seat track and the one or more cables with the seat track cover and the at least one cover adjustment member, wherein the one or more cables are within one of the first chamber or the second chamber away from the seat track.

12. The seat track covering method of claim 11, further comprising selectively moving the at least one cover adjustment member in relation to the seat track cover to adapt to one or both of a changing pitch or a changing length of the one or more cables between a first seat assembly and a second seat assembly within the internal cabin.

13. The seat track covering method of claim 11, further comprising securely coupling the seat track cover to the seat track with a seat track coupler.

14. The seat track covering method of claim 11, wherein the moveably coupling comprises slidably coupling a covering sleeve of the at least one cover adjustment member to the seat track cover.

15. The seat track covering method of claim 14, wherein the moveably coupling further comprises positioning the covering sleeve over the seat track cover.

16. The seat track covering method of claim 14, wherein the moveably coupling comprises hooking lateral hooks of the at least one cover adjustment member around lateral ends of the seat track cover.

17. The seat track covering method of claim 11, further comprising selectively moving the cover adjustment member between at least one fully extended position and a fully retracted position in relation to the seat track cover.

18. A vehicle comprising:
an internal cabin;
a first floor panel within the internal cabin;
a second floor panel within the internal cabin;
a seat track extending between the first floor panel and the second floor panel;
a first seat assembly coupled to the seat track;
a second seat assembly coupled to the seat track, wherein the first seat assembly and the second seat assembly are spaced apart from one another; and
a seat track covering system that covers the seat track and one or more cables within the internal cabin, the seat track covering system comprising:
a seat track cover that securely couples to the seat track, wherein the seat track cover comprises a seat track coupler extending downwardly from a lower surface of a main body of the seat track cover, wherein the main body is between lateral ends of the seat track cover, the seat track coupler comprising: (a) a longitudinal fin that extends along at least a portion of a length of the seat track cover; and (b) prongs extending from the fin, wherein the prongs extend into the seat track and hook under retaining arms of the seat track to securely couple the seat track cover to the seat track, wherein the seat track cover further comprises a first chamber disposed to a first side of the seat track coupler, and a second chamber disposed to a second side of the seat track coupler, wherein the first side is opposite from the second side, wherein the seat track covering system is configured to cover both the seat track and the one or more cables, and wherein the one or more cables are configured to be within one of the first chamber or the second chamber away from the seat track; and at least one cover adjustment member moveably coupled to the seat track cover, wherein the seat track cover and the at least one cover adjustment member cover at least a portion of the seat track and at least a portion of the one or more cables, wherein the at least one cover adjustment member is selectively moveable in relation to the seat track cover to adapt to one or both of a changing pitch or a changing length of the one or more cables between the first seat assembly and the second seat assembly within the internal cabin, wherein the cover adjustment member is selectively moveable between at least one fully extended position and a fully retracted position in relation to the seat track cover.

19. The seat track covering system of claim 1, wherein the prongs are separated by a gap.

20. The vehicle of claim 18, wherein the prongs are separated by a gap.

* * * * *